E. W. BURGESS.
STEERING MECHANISM FOR TRACTION ENGINES.
APPLICATION FILED JULY 5, 1916.
1,351,741.
Patented Sept. 7, 1920.
2 SHEETS—SHEET 1.
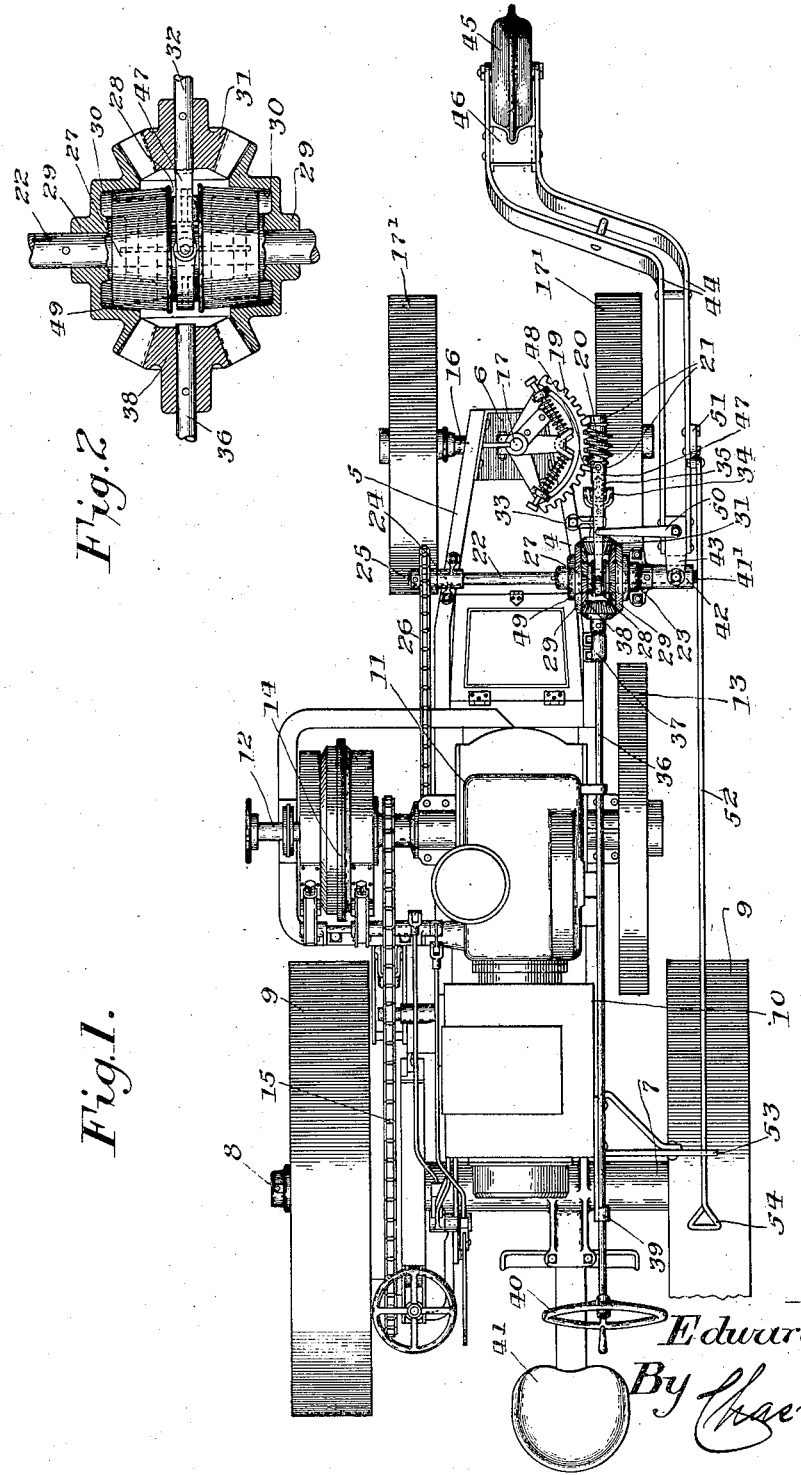
Inventor.
Edward W. Burgess,
By Chas. E. Lord
Atty.

E. W. BURGESS.
STEERING MECHANISM FOR TRACTION ENGINES.
APPLICATION FILED JULY 5, 1916.

1,351,741.

Patented Sept. 7, 1920.
2 SHEETS—SHEET 2.

Inventor:
Edward W. Burgess,
By Chas. E. Lord
Atty.

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

STEERING MECHANISM FOR TRACTION-ENGINES.

1,351,741.      Specification of Letters Patent.      Patented Sept. 7, 1920.

Application filed July 5, 1916. Serial No. 107,679.

*To all whom it may concern:*

Be it known that I, EDWARD W. BURGESS, a citizen of the United States, residing at Chicago, in the county of Cook and State of Illinois, have invented certain new and useful Improvements in Steering Mechanism for Traction-Engines, of which the following is a full, clear, and exact specification.

My invention relates to steering mechanism for traction engines, its object being to provide an automatically operating mechanism coöperating with the regular manually operable means whereby the tractor may be guided in a straight line across a field without manipulation of the steering mechanism by the operator, and means whereby the automatic steering mechanism is rendered inoperative when it is desired to use the manually operable means.

These objects are attained by means of the mechanism illustrated in the accompanying drawings, in which—

Figure 1 is a top plan view of a traction engine having my invention embodied in its construction;

Fig. 2 is a sectional detached detail of part of the automatic steering mechanism on an enlarged scale.

The same reference characters designate like parts throughout the several views.

Figure 3:
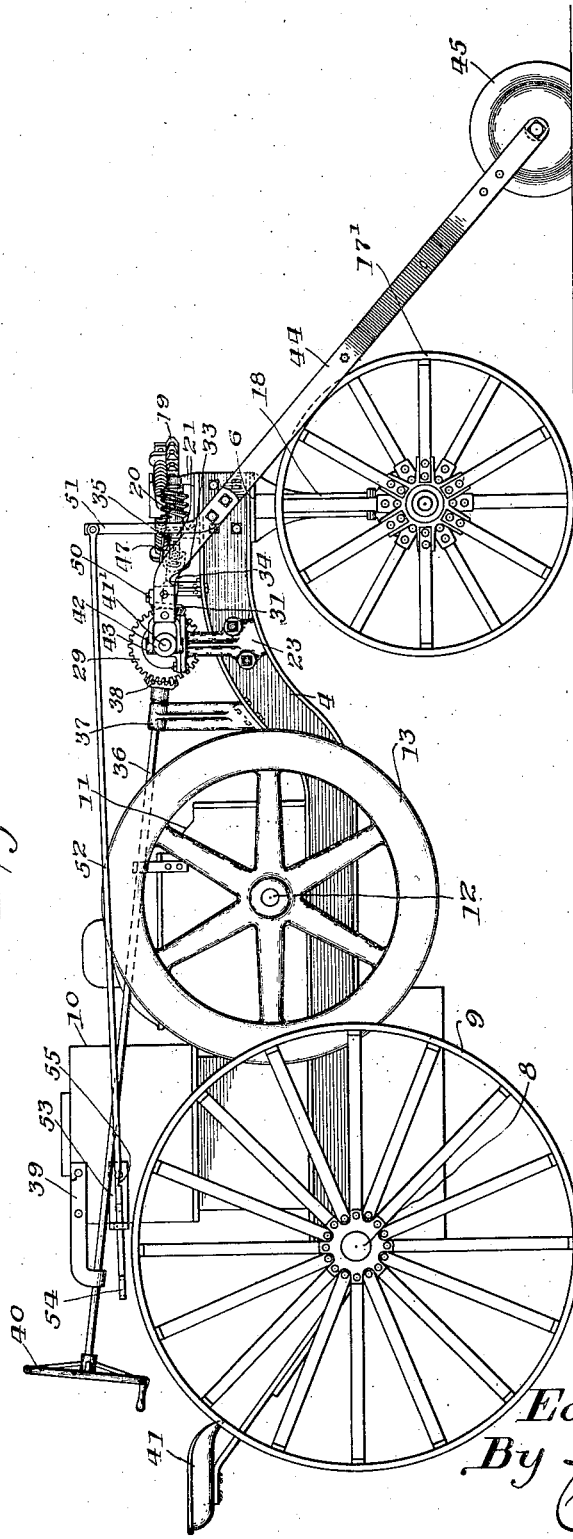
Fig. 3 is a side elevation of Fig. 1.

The tractor includes right and left-hand longitudinally disposed truck frame members 4 and 5, respectively, having their front ends secured to a bolster member 6 and their rear ends to a tubular, transversely disposed frame member 7, in which is journaled an axle 8, having traction wheels 9 mounted upon its opposite ends. 10 represents an engine mounted upon the truck frame and including a power cylinder 11, an engine shaft 12, fly wheel 13, and a power transmission gear 14 operatively connected with the axle 8 by means including a sprocket chain 15. The tractor steering mechanism includes a steering axle 16, to which is secured a vertically disposed spindle 17 journaled in a depending tubular member 18 forming part of the bolster member 6 and $17^1$ represents steering wheels mounted upon opposite ends of the axle. 19 represents a worm sector mounted upon the upper end of the spindle 17, and 20 a worm engaging therewith and journaled in bearing members 21. 22 represents a transversely disposed shaft journaled in bearing members 23 and 24 secured to the truck frame members 4 and 5, respectively, and given constant rotation by means including a sprocket wheel 25 and chain 26 connecting it with a moving part of the power transmission mechanism of the engine. Splined upon the shaft, and rotatable therewith, is a double cone friction clutch member 27 provided with a central channel 28 between the two cones. Journaled upon the shaft are two bevel gears 29, having inner friction shells 30 adapted to engage with the friction cones. 31 represents a pinion meshing with the bevel gears and secured to the rear end of a longitudinally disposed shaft 32 journaled in a bearing member 33 secured to the truck frame member 4 and having secured to its front end a universal coupling member 34 whereby it is operatively connected with a corresponding coupling member 35 secured to the worm 20.

36 represents a longitudinally disposed shaft having its front end journaled in a bearing box 37 carried by the truck frame and having secured thereto a pinion 38 meshing with the bevel gears 29. The rear end of the shaft 36 is journaled in a bracket member 39 carried by the truck frame, and 40 represents a steering wheel secured thereto within convenient reach of an operator from the seat 41 whereby the tractor steering mechanism may be manipulated manually.

The automatic steeering means includes a laterally extending stub shaft $41^1$ secured to the bearing member 23, and having journaled thereon a sleeve 42, to which is pivotally connected a forwardly extending forked member 43. Secured to the forked member are forwardly and downwardly extending spaced bars 44 that are curved inwardly in front of the steering wheels of the tractor and then forward, and forming a steering arm, and 45 represents a gage wheel journaled upon the front end of the arm and adapted to travel in a prepared furrow, preferably centrally located relative to the path of advance of the tractor, and 46 a scraper secured to the bars adjacent the rim of the wheel. 47 represents a radius bar having its front end pivoted at 48 to a fixed part of the structure, and pivotally connected with its rear end is a clutch shipping fork 49 received by the channel 28 in the cone clutch member 27, and 50 represents a link having one end pivotally connected with the forked member 43, the other end being downwardly and engaging in a hole in the bar 47. 51 represents a vertically disposed arm secured to one of the spaced bars 44 and having its upper end pivotally connected with the front end of a pull bar 52 that extends rearward, having its rear end slidably received by a bracket member 53 carried by the truck frame and provided with a hand receiving loop 54 convenient to the hand of the operator whereby the steering arm and gage wheel 45 may be raised from the guiding furrow when the tractor is being turned at the end of a field, and 55 represents a notch in the pull bar adapted to engage with the bracket member 53 in a manner to retain the gage wheel in an elevated position. As the steering arm is being raised the link 50 rises therewith, the downwardly bent end sliding in the hole in the bar 47. When the steering arm is in final elevated position, the bent end of the link 50 may be entirely disengaged from the bar 47 so that swinging of the steering arm will have no effect on the clutch 27.

The automatic steering mechanism is adapted for use with a tractor when operating a grain drill, corn planter, or corn or grain cultivator wherein it is necessary that the lines of seed planting and cultivation be undeviating and in parallelism with each other. It is understood that the various implements will be provided with land markers adapted to open a furrow at either side of the machine that will be properly spaced to receive the gage wheel of the steering mechanism on the succeeding passage across the field. With the gage wheel in a furrow and the tractor advancing, if there be any deviation in the line of advance relative to the gage furrow, the gage wheel will cause the forked member 43 to turn in a direction to throw either one of the cone clutch members 27 in engagement with its complemental friction shell 30 carried by the bevel gears 29 in a manner to rotate the steering shafts 32 and 36 in a direction to turn the steering wheel 17¹ of the tractor in a direction to relieve the gage wheel of side pressure and thereby permit the cone clutch members 27 to assume a neutral position between the bevel gears 29. The steering mechanism may be operated in the regular way by means of the manually operable steering wheel 40 when turning at the end of a field or to correct the line of advance of the tractor if the gage wheel should be accidentally turned from the prepared furrow.

Having shown and described one form which my invention may assume in practice, I do not desire that it be confined to the specific details of its construction as illustrated, it being understood that changes may be made in the form, proportion and organization of its several parts without departing from the spirit of my invention as indicated by the scope of the appended claims.

What I claim as my invention, and desire to secure by Letters Patent, is:

1. In combination, a tractor having a steering wheel, automatic steering means including a gage wheel in advance of the tractor and power driven mechanism including a clutch and gears operatively connecting the gage wheel and steering wheel for automatically angling said steering wheel, and manual steering means independent of the clutch and operable through said gears for manually angling the steering wheel.

2. In a tractor steering mechanism, steering wheels, means for controlling the line of travel of said steering wheels including a constantly rotatable shaft, a double faced clutch element splined upon said shaft, bevel gears journaled upon said shaft and adapted to be engaged by said clutch element, a gage element traveling in a prepared furrow, a connection between said clutch element and gage element for controlling the engagement of the clutch element and gears, and manually operable means for controlling said steering wheels through said bevel gears.

3. In a tractor steering mechanism, steering wheels, means for controlling the line of travel of said steering wheels, including a constantly rotatable shaft, a double faced clutch element splined upon said shaft, bevel gears journaled upon said shaft upon opposite sides of said clutch element and adapted to engage with said clutch element, and means for controlling engagement of said clutch element and gears, including a gage element traveling in a prepared furrow, a steering arm connecting said gage element and said clutch element, a manually controlled rotatable shaft, and a pinion secured thereto and meshing with said bevel gears.

4. In a tractor steering mechanism, steering wheels, means for controlling the line of travel of said steering wheels, including a constantly rotatable shaft, a double faced clutch element splined upon said shaft, bevel gears journaled upon said shaft upon opposite sides of said clutch element and adapted to engage with said clutch element, means for controlling engagement of said clutch element and gears, including a rising and falling and laterally swinging steering arm having one end thereof pivotally mounted upon a fixed part of the truck frame of the tractor and its opposite end carrying a steering element adapted to travel in a prepared furrow, and operative connections between said steering arm and said double faced clutch element and manually operated means engaging said bevel gears for controlling the steering wheels when the clutch element and gears are disengaged.

5. In a tractor steering mechanism, steering wheels, means for controlling the line of travel of said wheels including a constantly rotating member, oppositely disposed bevel gears adapted to be engaged thereby, an automatic steering arm connected to the rotating member and adapted to cause it to engage either bevel gear, means for transmitting motion from either bevel gear to the steering wheels, and a manual steering means operable through said bevel gears.

6. In a tractor steering mechanism, steering wheels, means for controlling the line of travel of said wheels including a pair of bevel gears journaled on a driven shaft, clutch means driven by the shaft and slidable thereon, a steering arm adapted to shift the clutch means to engage either bevel gear, a bevel gear for connecting said bevel gears to the steering wheels at one side and another bevel gear connected to said bevel gears at a point substantially opposite the last mentioned bevel gear being driven by a hand steering wheel.

In testimony whereof I affix my signature.

EDWARD W. BURGESS.